Patented Sept. 29, 1942

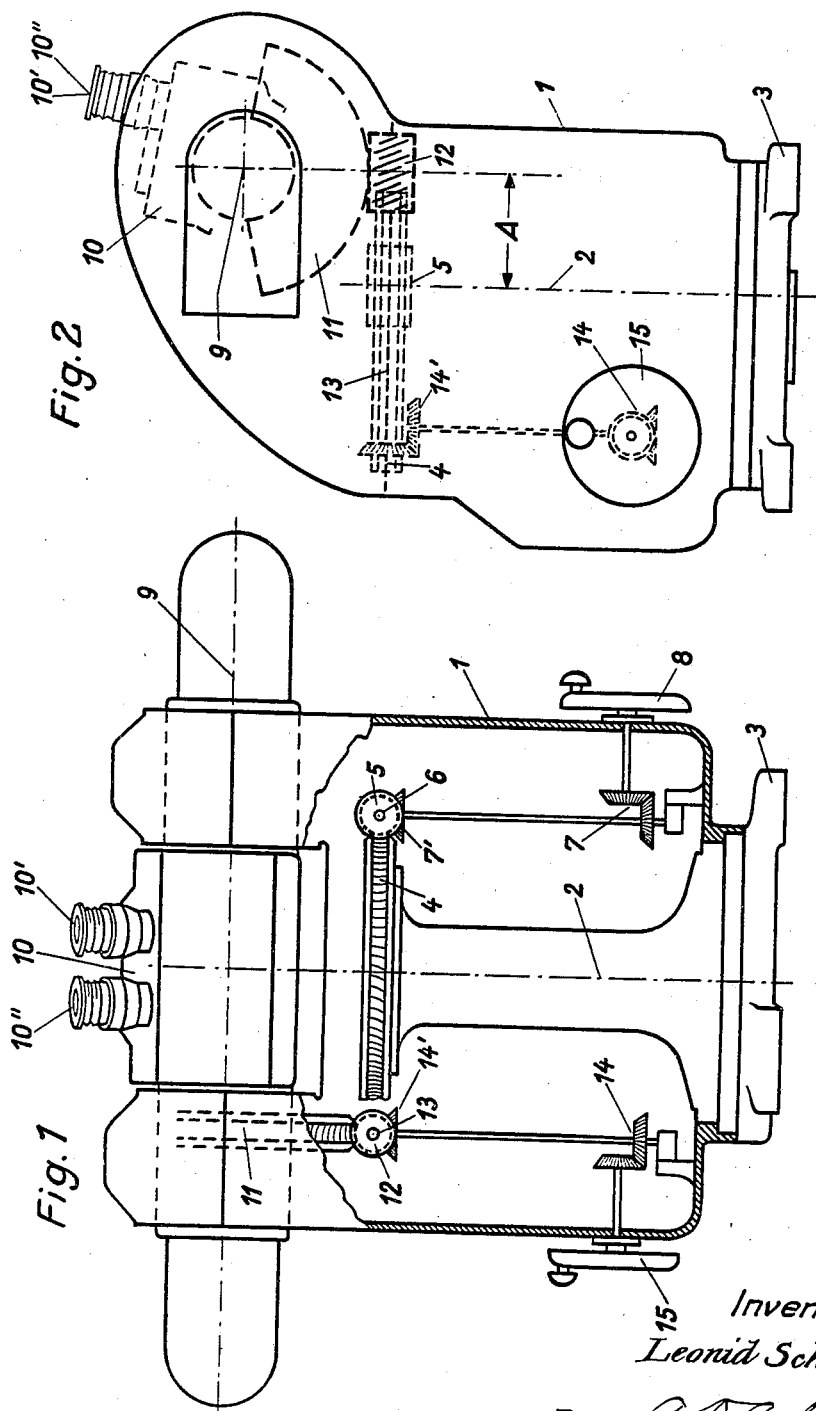

2,297,507

UNITED STATES PATENT OFFICE 2,297,507

THEODOLITE, PARTICULARLY FOR MOVING OBJECTS

Leonid Schomann, Berlin-Sudende, Germany; vested in the Alien Property Custodian Application October 14, 1940, Serial No. 361,132
In Germany October 17, 1939

2 Claims. (Cl. 33—69)

The invention relates to theodolites with azimuthal axial systems, i. e., with a vertical principal axis and a horizontal secondary axis. The invention particularly refers to theodolites serving to pursue moving aims and in which the eyepiece of the telescope is arranged within the plane of vision with a view to facilitating the procedure. It is of great practical importance to the observer to be able to look in the direction of the aim while making his observations, as he is then better able to perceive and to follow any change of direction. However, the arrangement of the telescopic eyepiece in the plane of vision is connected with great structural difficulties. According to the known construction the distance of the eyepiece from the secondary axis—considering the size of the body of the theodolite and the distance to be kept between the theodolite and the observer—must be pretty considerable to prevent the observer being hampered in operating the driving elements. The fact that there has to be so great a distance between the telescope eyepiece and the secondary axis is a great drawback, as at an upward adjustment the view travels over a large circular arc which involves uncomfortable and tiring postures on the part of the observer.

In order to eliminate these drawbacks and to obtain further constructional advantages, it is proposed according to the invention to displace the horizontal secondary axis relative to the perpendicular principal axis in the direction toward the observer. Such displacement of the secondary axis by even a short distance from the eyepiece of the telescope permits observations to be made in comfort and greatly facilitates the operation of the apparatus. In consequence of such displacement of the secondary axis relative to the principal axis the distance of the observer from the body of the theodolite is increased by the same amount provided the conditions otherwise remain the same. Consequently the possibility exists of giving the body of the theodolite and the worm wheel serving for the azimuthal drive a greater diameter. This offers in addition a number of other advantages from the point of view of construction which cannot be enumerated here. Thus, for instance, auxiliary instruments (such as cameras, photo-electric releasing arrangements or the like) may be mounted on the secondary axle on the side toward the observer without interfering with the possibility of elevation or increasing the constructional height.

A special advantage of such forward displacement of the secondary axle is that it permits the mounting of a finder telescope resembling in construction a range finder, in which the rays are guided through the secondary axle. If it should be desirable to provide such a finder telescope in theodolites of the usual construction, this would obviously be connected with great structural difficulties. The use of such a finder telescope of a construction similar to that of a range finder offers, however, very considerable advantages; lenses of great focal strength and intensity may easily be arranged without undue loading of the axle and due to the great objective distance the image to be observed becomes more plastic. Therefore the displacement of the secondary axis in accordance with the invention rendering possible the use of a finder telescope of the kind referred to represents not only a constructional improvement but also a considerable progress from an optical point of view.

In some apparatuses for conveying firing orders range finders are combined with azimuthally turnable calculating devices in such manner that the horizontal axis of the range finder is displaced relative to the azimuth axis of the calculating device. There is no connection, however, between this kind of arrangement and theodolites and the above mentioned questions of the construction of theodolites. In theodolites in which the azimuth and elevating movements are effected by means of worm gearing, the displacement of the secondary axis offers the advantage that the horizontal worm gear shaft may be arranged symmetrically to the secondary axis. This kind of arrangement is only possible when the secondary axis is displaced as otherwise one of the worm shafts would mesh with both the horizontal and the perpendicular worm wheel. The symmetric arrangement of the worm gear shafts offers, however, great constructional advantages, as it is possible with the same driving mechanism for the worm gear shafts to simply exchange these latter and in this way arrange either the azimuth or elevating drive on the right side or vice versa. This exchange of the driving parts in a symmetrical arrangement of the worm gear shafts is possible without any changes having to be made as regards the model or the construction per se and without extra cost. In this way one and the same basic form of the theodolite may be adapted to the respective use.

The invention is explained in greater detail in the following with reference to the drawing, in which—

Fig. 1 is a front view, partly in section, of an embodiment of the invention, and Fig. 2 a side view of the same. The reference characters are the same for identical parts in both figures.

A theodolite casing 1 is rotatably supported on a base 3 about the principal axis 2. A worm wheel 4 is firmly connected with the base 3 and meshes with a worm supported in the casing 1. The shaft 6 of the worm 5 is actuated by hand by means of a turning or hand wheel 8 likewise supported on the casing by means of a bevel gear 7, 7'. The azimuth adjustment of the theodolite as well as the elevation to be described later is transferred in known manner— not represented—on to graduated circles or to cyclometers and, if necessary, recorded by printing or photography. In the casing 1 a binocular finder telescope similar in construction to a range finder is mounted for rotation about the secondary axis 9. The axis 9 is displaced relative to the principal axis 2 toward the binocular eyepieces 10', 10" by the amount A. A worm wheel segment 11 is mounted on a telescope 10, said segment meshing with a worm 12 supported in the casing 1. The shaft 13 of the worm 12 is actuated by hand wheel 15 by means of bevel gears 14, 14' which correspond to the gears 7, 7'. The horizontal worm shafts 6 and 13 are arranged perpendicularly to the secondary axis 9 and symmetrically to the principal axis 2. As the worm wheel segment 11 is displaced with the secondary axis 9 relative to the principal axis 2, the elevating worm gear 12, in spite of the symmetrical arrangement of the worm gear shafts 6 and 13, will be removed from the range of the worm wheel 4 and hence will not set up any disturbance. In this symmetric arrangement of the worm shafts 6 and 13 it is possible without difficulty to interchange the shafts 6 and 13, in which case, however, the worm wheel segment 11 must likewise be arranged on the other side, or a similar segment must be provided on the other side as well. In this case the elevating worm 12 will be driven by means of the hand wheel 8 by means of bevel gears 7, 7' and the azimuth worm gear 5 by means of the hand wheel 15 through the bevel gears 14, 14'. In this way the azimuth and elevating gears may be exchanged without any difficulty. The distance of the eyepieces 10', 10" of the telescope 10 from the secondary axis 9 may be made relatively small. Provided the observer assumes the same position relative to the theodolite casing 1, the above mentioned distance may be smaller by the amount A than in the usual theodolite construction, in which the principal and secondary axes intersect.

It is of course possible to arrange other kinds of finder telescopes for rotation about the secondary axis 9 or additionally arrange, on a rotatable carrier mounted on the secondary axle, without in any way departing from the scope of the invention, a camera or a photo-electrical instrument. In all such cases a displacement of the secondary axis is an advantage. If such parts mounted on the secondary axis are on the side facing the observer, this will not interfere with the elevating movement nor necessitate that the dimensions of the theodolite be increased, provided the axes have been arranged in accordance with the inventive principle.

What I claim is:

1. A theodolite, particularly for sighting moving objects comprising, in combination, a bell-shaped casing having a head portion, a stationary vertical columnar bearing arranged in the center of the bell-shaped casing, means for rotating the casing on the vertical columnar bearing, the head portion of the casing having two horizontal bearings therein spaced from each other and arranged in a plane lying in front of the plane through the axis of said vertical bearing, an observation telescope supported horizontally in the horizontal bearings, an eyepiece of the telescope being arranged between the two bearings, and means for rotating the telescope on a horizontal axis.

2. A theodolite, particularly for sighting moving objects comprising, in combination, a bell-shaped casing having a head portion, a stationary vertical columnar bearing arranged in the center of the bell-shaped casing, means for mounting the casing on the vertical columnar bearing for rotation about a normally vertical axis, the head portion of the casing having two horizontal bearings therein spaced from each other and arranged in a plane lying in front of the plane through the axis of said vertical bearing, a binocular observation telescope supported horizontally in the horizontal bearings, the eyepieces of the telescope being arranged between the two horizontal bearings and the objectives being arranged at both ends of the telescope casing, means for rotating the telescope on a horizontal axis, the means for rotating the bell-shaped casing and the telescope comprising worm gears, a first worm wheel segment fixed to the casing of the telescope, a horizontally mounted first worm cooperating with the segment, a second worm wheel fixed to the head of the columnar bearing, a horizontally arranged second worm cooperating with the second worm wheel, the two axes being symmetrically arranged relative to the vertical axis and vertically arranged relative to the horizontal axis of the theodolite, hand cranks for actuating the two worm gears and arranged on the outside of the bell-shaped casing, and bevel wheels cooperating with the hand cranks and the worm gear for the transmission of movement of the hand cranks to the worm gears, all the worm gears and bevel wheels being arranged on the inside of the bell-shaped casing.

LEONID SCHOMANN.